Oct. 12, 1965   A. F. N. LINDSJO ETAL   3,211,010
INDICATING BALANCING DEVICE
Filed July 10, 1962   2 Sheets-Sheet 1

United States Patent Office 3,211,010
Patented Oct. 12, 1965

3,211,010
INDICATING BALANCING DEVICE
Anders Folke Napoleon Lindsjo, Stockholm, and Nils Gunnar Cronhage, Vallingby, Sweden, assignors to Aktiebolaget Electrolux, Stockholm, Sweden, a corporation of Sweden
Filed July 10, 1962, Ser. No. 208,730
Claims priority, application Sweden, July 14, 1961, 7,351/61
19 Claims. (Cl. 73—483)

Our invention relates to balancing devices.

The object of our invention is to provide an improved static balancing device of simplified construction for indicating the unbalance of a fan, rotor or like object.

The above and other objects and advantages of the invention will become apparent as the following description proceeds, and the features of novelty which characterize our invention will be pointed out with particularity in the claims annexed to and forming a part of this specification.

For a better understanding of our invention, reference may be had to the following description taken in connection with the accompanying drawing in which.

Figure 1:
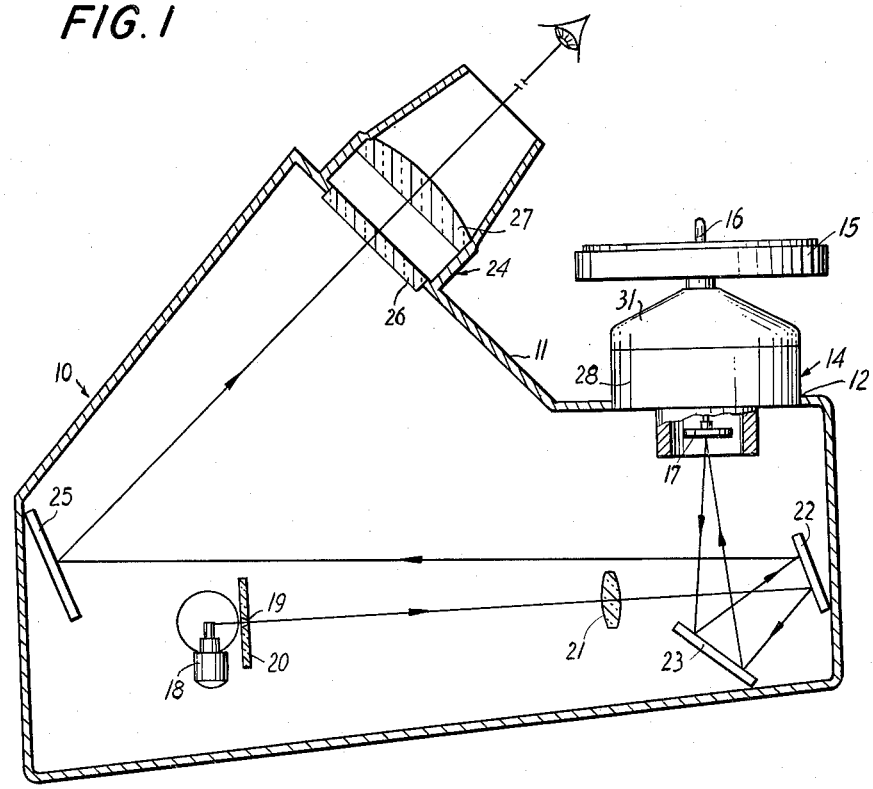
FIG. 1 is a view, partly in section, more or less diagrammatically illustrating a balancing device embodying the invention.

Referring to FIG. 1 of the drawing, we have shown our invention in connection with an optical instrument 10 which includes a casing 11, at an opening 12 of which is mounted a balancing device 14 upon which is held a rotatable object 15 to be balanced. The object 15 is fixed to the upper end of a vertical shaft 16 which extends downward through the balancing device 14, and to the lower end of which is fixed a mirror 17.

The optical instrument 10 includes a source of light 18 from which a beam passes through a slit 19 in a plate 20. A lens 21 focuses and concentrates the beam of light on a mirror 22 from which it is reflected to a mirror 23. From the mirror 23 the beam of light is reflected to the mirror 17 at the lower end of the shaft 16. From the mirror 17 the beam of light is reflected back to the mirror 23 and from the latter to an eye-piece 24 by the mirror 22 and another mirror 25. The eye-piece 24 includes a ground glass plate 26 upon which the beam of light can be observed as a point through a condenser lens 27.

When the object 15 positioned on the device 14 is unbalanced, the shaft 16 will assume a position which is inclined to the vertical, as will be described presently. From the location of the point of light on the ground glass plate 26 with respect to a reference point and from the angular distance of the point of light with respect to an arbitrarily selected radial line extending from the reference point, the magnitude and position of unbalance of the object can be observed. Accordingly, the ground glass plate 26 may be provided with suitable indicia including, for example, lines which extend radially from the reference point and intersect circles of different diameters which surround the reference point.

In accordance with our invention, the balancing device 14 comprises a body 28 having a pair of cavities 29 and 30, the cavity 29 being of cylindrical form and open at the bottom, and the cavity 30 being of annular form and disposed about the cavity 29 and open at the top. The body 28 is provided with a cover 31 having a top opening 32 which receives an apertured sleeve 33. The sleeve 33 is fixed to the vertical shaft 16 and extends through an opening 34 of a horizontally positioned ring-shaped member 35 mounted on the body 28 by pins 36, the sleeve 33 being spaced from the ring-shaped member 35.

The vertical shaft 16 passes through an opening 37 in a wall 38 of the body 28 at the closed end of the cavity 29. About the shaft 16 is disposed a helical coil spring 39, the upper end of which is fixed and firmly secured at 39a to the wall 38 and the lower end of which is fixed and firmly secured at 39b to a disk 40 secured to the shaft 16. The mirror 17 fixed to the shaft 16 is located beneath the disk 40.

It will now be understood that the object 15 and the vertical shaft 16 are resiliently mounted on the stationary member or body 28 by the coil spring 39, and that the balancing device 14 functions as a spring scale when an object to be balanced is held on the vertical shaft or element 16. The bottom of the sleeve 33 is formed with an outwardly extending flange 41 having openings through which the pins 36 extend. Members 42 are fixed to the lower ends of elongated rods 43, the upper ends of which are secured to the flange 41. The members 42 are immersed in a body 44 of liquid which is held in the cavity 30 and serves to dampen movement imparted to the vertical shaft 16 when an object is placed thereon.

It will now be understood that the helical coil spring 39 acts to yieldingly support the vertical shaft 16 and object 15 in a definite position, and that the latter are movable from the definite position responsive to unbalance of the object 15. As pointed out above, the unbalance of the object 15 can be determined visually with the aid of the optical instrument 10 which includes the source of light 18 and the mirror and lens system, of which the mirror 17 at the lower end of the vertical shaft 16 forms a component part.

Figure 2:
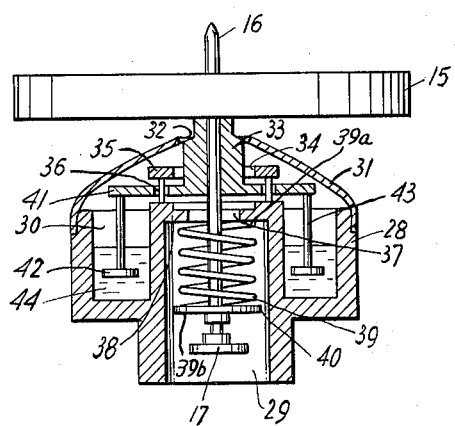
FIG. 2 is a vertical sectional view of the balancing device shown in FIG. 1 to illustrate details more clearly.
Figure 3:
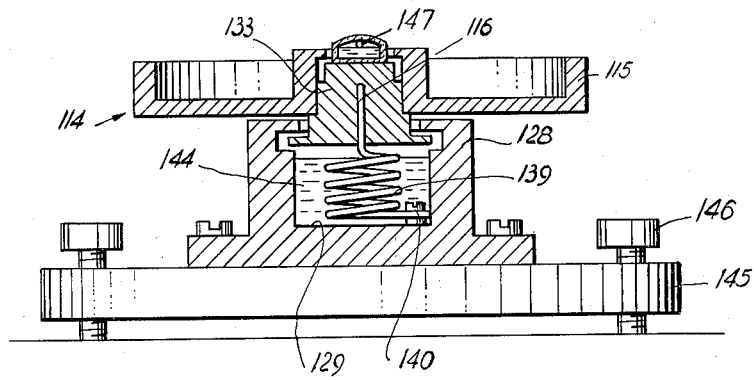
FIGS. 3 and 4 are vertical sectional views of balancing devices similar to the one shown in FIG. 2 illustrating modifications of the invention.

FIG. 3 illustrates a balancing device 114 which is a modification of the balancing device shown in FIGS. 1 and 2 and just described. In FIG. 3 the balancing device 114 includes a body 128 mounted on a base 145 provided with leveling screws 146 to level the device. The body 128 is formed with a central cavity 129 having a top opening. An upright helical coil spring 139 is disposed in the cavity 129, the lower end of which is fixed and firmly secured at 140 to the body 128 at the closed end of the cavity.

The upper end of the coil spring 139, which is immersed in a body 144 of damping liquid held in the cavity 129, is formed with an upright pin 116 which is fixed and firmly secured in the lower end of an apertured member 133 and supports the apertured member 133 upon which is mounted the object 115. At the top of the apertured member 133 is provided a spirit level 147 of circular form which may have suitable indicia on the transparent cover thereof for directly indicating the position and magnitude of unbalance of the object 115.

Figure 4:
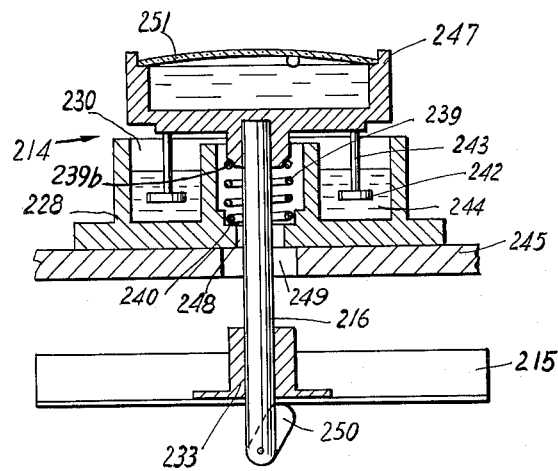

FIG. 4 illustrates a balancing device 214 showing another modification of our invention. The balancing device 214 includes a body 228 mounted on a supporting frame or base 245. The body 228 is formed with a cavity 230 of annular form and having a top opening. A helical coil spring 239, the lower end of which is fixed and firmly secured to the body 228 at 240 about an opening 248 therein, is disposed about a vertical pin 216 which extends downward through the opening 248 and an opening 249 in the frame 245.

A spirit level 247 is fixed to the upper end of the pin 216 and forms a unitary part thereof. The upper end of the coil spring 239 is fixed and firmly secured at 239b to the element 216. Members 242 are fixed to the lower ends of rods 243, the upper ends of which are secured to the spirit level 247. The members 242 are immersed in a body 244 of liquid held in the cavity 230 and serve to dampen movement imparted to the spirit level 247 and pin 216 when an object 215 is fixed to the lower end of the pin. As shown, the object 215 may be clamped by a hinged hook 250 against the bottom of a hollow sleeve 233 fixed to pin 216.

The spirit level 247 may be provided with a transparent cover 251 having suitable indicia thereon for directly indicating the position and magnitude of unbalance of the object 215 removably secured to the lower end of the pin 216 and centered thereon.

It will now be understood that we have provided an improved device for statically balancing a rotatable object with its axis vertically disposed. In the embodiment of FIG. 2, for example, the axis of the pin or element 16 is normally upright or vertical. The coil spring 39 is vertically disposed in axial alignment with the normal upright or vertical axis of the element 16. The coil spring 39 supports the element 16 on the stationary body member 28 with the axis of the element 16 normally upright or vertical, the element 16 being adapted to hold the object 15 to be statically balanced. The upper end of the coil spring 39 is fixed and firmly secured at 39a to the body member 28 and the lower end of the coil spring is fixed and firmly secured at 39b to the element 16.

The coil spring 39 is self-sustaining and tends to resist oscillating movement imparted thereto about the normal upright or vertical axis of the element 16. The first and second connecting means 39a and 39b provide rigid connections between the opposing ends of the coil spring 39 and the body member 28 and vertical element 16, respectively, for the coil spring to transmit therethrough from the element 16 to the body member 28 the entire static weight of the object 15 to be statically balanced and for the coil spring 39 to incline about the normal upright or vertical axis of the element 16 at a region between the upper and lower ends of the coil spring 39 and effect angular movement of the element 16 from the reference point responsive to unbalance of the object. In FIG. 1 the device of FIG. 2 is embodied in apparatus including the optical instrument 10 which is affected by the angular movement of the element or pin 16 for indicating on the ground glass plate 26 the unbalance of the object 15 from the reference point.

Although we have illustrated and described particular embodiments of our invention, we desire not to be limited to the particular arrangements set forth, and we intend in the following claims to cover all modifications which do not depart from the spirit and scope of the invention.

We claim:

1. A device for statically balancing a rotatable object comprising an element having an axis which normally is upright or vertical, elongated vertically disposed resilient means in axial alignment with the normal upright or vertical axis of said element, a stationary member, means including said resilient means for supporting said element on said member with the axis of said element upright or vertical, said element being adapted to hold thereon the rotatable object to be statically balanced, said element and said member having first and second parts, respectively, first connecting means for fixing and firmly securing one end of said resilient means to one of said parts and second connecting means for fixing and firmly securing the opposite end of said resilient means to the other of said parts, said resilient means having its opposing upper and lower ends movable toward and from one another, said resilient means being self-sustaining and tending to resist oscillating movement imparted thereto about the normal upright or vertical axis of said element, said element being disposed in a position defining a reference point when the object held thereon is balanced, said first and second connecting means providing rigid connections between the opposing ends of said resilient means and said parts for said resilient means to transmit therethrough from said element to said member the entire static weight of the object to be statically balanced and for said resilient means to incline about the normal or upright vertical axis of said element at a region between the upper and lower ends of said resilient means and effect angular movement of said element from the reference point responsive to unbalance of the object, and means affected by the angular movement of said element from the normal upright or vertical axis thereof for indicating the unbalance of the object from the reference point.

2. A device for statically balancing a rotatable object comprising an element for having an axis which normally is upright or vertical, a vertically disposed coil spring in axial alignment with the normal upright or vertical axis of said element, a stationary member, means including said coil spring for supporting said element on said member with the axis of said element upright or vertical, said object adapted to hold thereon the rotatable object to be statically balanced, said element and said member having first and second parts, respectively, first connecting means for fixing and firmly securing one end of said coil spring to one of said parts and second connecting means for fixing and firmly securing the opposite end of said coil spring to the other of said parts, said coil spring having its opposing upper and lower ends movable toward and from one another, said coil spring being self-sustaining and tending to resist oscillating movement imparted thereon about the normal upright or vertical axis of said element, said element being disposed in a position defining a reference point when the object held thereon is balanced, said first and second connecting means providing rigid connections between the opposing ends of said coil spring and said parts for said coil spring to transmit therethrough from said element to said member the entire static weight of the object to be statically balanced and for said coil spring to incline about the normal upright or vertical axis of said element at a region between the upper and lower ends of said coil spring and effect angular movement of said element from the reference point responsive to unbalance of the object, and means affected by the angular movement of said element from the normal upright or vertical axis thereof for indicating the unbalance of the object from the reference point.

3. A device as set forth in claim 2 in which said vertically disposed coil spring is of helical form.

4. A device as set forth in claim 3 in which said element extends through said helical coil spring and said first connecting means fixes and firmly secures one end of said coil spring to said first part associated with said element.

5. A device as set forth in claim 4 in which said first connecting means fixes and firmly secures the lower end of said coil spring to said first part associated with said element.

6. A device as set forth in claim 4 in which said first connecting means fixes and firmly secures the upper end of said coil spring to said first part associated with said element.

7. A device as set forth on claim 2 in which said member includes means defining a vessel of annular form disposed about said coil spring, said vessel having spaced inner and outer walls, a body of liquid in said vessel, and means carried by said element which includes spaced portions which are distributed about said vessel and immersed in the body of liquid therein and spaced from said inner and outer walls for damping said element when angular movement thereof is effected from the reference point, said coil spring and at least a part of the body of liquid in which parts of said spaced portions are immersed being substantially in the same vertical range.

8. A device as set forth in claim 2 in which said element is vertically movable on said coil spring, and said member having vertically spaced zones in the path of movement of said element to restrict vertical movement thereof, said vertically spaced zones being at a level above the upper end of said coil spring.

9. A device as set forth in claim 8 in which said element includes a part having a plurality of spaced openings, said member including a first portion on the lower side of said last-mentioned part constituting a lower one of said zones, and an annular-shaped unit disposed about said element on the upper side of said last-mentioned part constituting an upper one of said zones, and means for mounting said annular-shaped unit on said member comprising elements which are fixed to said unit and project downward through the openings in said part, the first portion of said member constituting the lower one of said zones being at a level above the upper end of said coil spring.

10. A device for statically balancing a rotatable object comprising an element having an axis which normally is upright or vertical, a vertically disposed coil spring in axial alignment with the normal upright or vertical axis of said element, a stationary member, means including said coil spring for supporting said element on said member with the axis of said element upright or vertical, said element being adapted to hold thereon the rotatable object to be statically balanced, said element and said member having first and second parts, respectively, first connecting means for fixing and firmly securing one end of said coil spring to one of said parts and second connecting means for fixing and firmly securing the opposite end of said coil spring to the other of said parts, said coil spring having its opposing upper and lower ends movable toward and from one another, said coil spring being self-sustaining and tending to resist oscillating movement imparted thereto about the normal upright or vertical axis of said element, said element being disposed in a position defining a reference point when the object held thereon is balanced, said first and second connecting means providing rigid connections between the opposing ends of said coil spring and said parts for said coil spring to transmit therethrough from said element to said member the entire static weight of the object to be statically balanced and for said coil spring to incline about the normal upright or vertical axis of said element at a region between the upper and lower ends of said coil spring and effect angular movement of said element from the reference point responsive to unbalance of the object, a downwardly facing mirror fixed to said element below the lower end of said coil spring, and means including an optical instrument having a source of light and a mirror and lens system which is affected by the angular movement of said element from the normal upright or vertical axis thereof for visually indicating the unbalance of the object from the reference point, said optical instrument including said mirror fixed to said element.

11. A device as set forth in claim 10 in which said optical instrument includes a screen and eye piece, and means embodied in said optical instrument to indicate visually on said screen with the aid of said eye piece the unbalance of the object from the reference point.

12. A device as set forth in claim 11 in which said optical system comprises an even number of mirrors, the even number of mirrors including said mirror fixed to said element.

13. A device as set forth in claim 12 in which said optical system comprises four mirrors.

14. A device as set forth in claim 10 which includes a casing having first and second openings, said element being mounted on said casing at the first opening with said element for holding the object being disposed exteriorly of said casing and said downwardly facing mirror fixed to said element being disposed within said casing, the source of light and mirror and lens system of said optical instrument being disposed within said casing and said eye piece and screen of said optical instrument being mounted on said casing at the second opening.

15. A device as set forth in claim 2 in which said vertically disposed coil spring is of helical form and said element is in axial alignment with the axis of said coil spring, said first connecting means fixing and firmly securing the upper end of said coil spring to said first part associated with said element and said second connecting means fixing and firmly securing the lower end of said coil spring to said second part associated with said member.

16. A device as set forth in claim 15 in which said member comprises means defining a vessel, said coil spring being disposed in said vessel, and a body of liquid in said vessel for damping said coil spring.

17. A device as set forth in claim 16 in which said second part to which the lower end of said coil spring is fixed and firmly secured is disposed at the bottom of said vessel.

18. A device as set forth in claim 15 comprising means including a spirit level carried by said element for indicating the unbalance of the object from the reference point, said spirit level being carried at the upper end of said element, and said element including means for holding the object at the vicinity of said spirit level.

19. A device as set forth in claim 2 in which said element extends downward through said coil spring, said member having an opening through which said element extends downward therethrough, and means including a spirit level carried by said element for indicating the unbalance of the object from the reference point, said spirit level being carried at the upper part of said element, and said element including means for holding the object thereon at a zone below the opening in said member.

References Cited by the Examiner

UNITED STATES PATENTS

| 953,811 | 4/10 | Bassett | 73—483 |
| 2,172,006 | 9/39 | Buckner | 73—486 |
| 2,349,288 | 5/44 | Lannen | 73—485 |
| 2,565,732 | 8/51 | Koertge et al. | 73—484 |
| 2,567,597 | 9/51 | Currier | 73—484 |
| 2,816,446 | 12/57 | Palmer | 73—483 |
| 2,909,063 | 10/59 | Bageman | 73—484 |
| 3,008,327 | 11/61 | Hrebicek | 73—66 |

FOREIGN PATENTS

| 694,648 | 7/53 | Great Britain. |
| 750,987 | 6/56 | Great Britain. |

RICHARD C. QUEISSER, *Primary Examiner.*

ROBERT L. EVANS, JAMES J. GILL, *Examiners.*

UNITED STATES PATENT OFFICE
CERTIFICATE OF CORRECTION

Patent No. 3,211,010            October 12, 1965

Anders Folke Napoleon Lindsjo et al.

It is hereby certified that error appears in the above numbered patent requiring correction and that the said Letters Patent should read as corrected below.

Column 4, line 10, strike out "for"; line 16, for "object" read -- element being --; line 26, for "thereon" read -- thereto --; same column 4, line 57, for "on" read -- in --.

Signed and sealed this 28th day of June 1966.

(SEAL)
Attest:

ERNEST W. SWIDER
Attesting Officer

EDWARD J. BRENNER
Commissioner of Patents